Oct. 7, 1930.  P. A. FRANK  1,777,405
TIRE BUILDING DRUM
Filed Sept. 25, 1928  2 Sheets-Sheet 1

INVENTOR.
PAUL A. FRANK.
BY Ely + Barrow
ATTORNEYS.

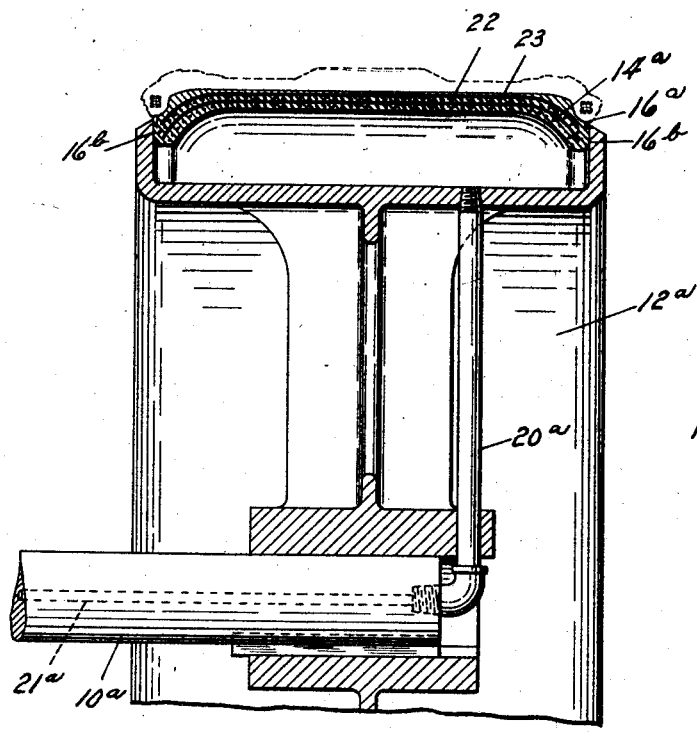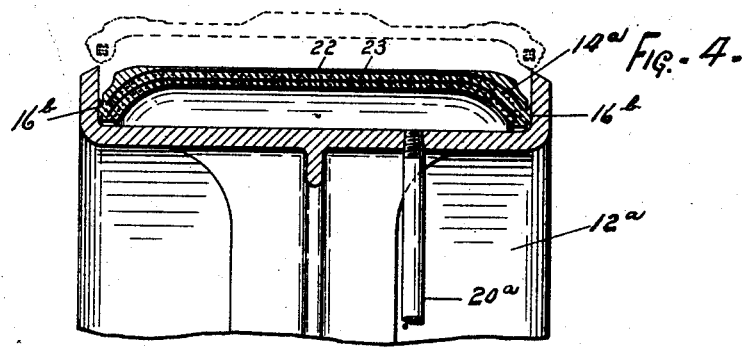

Patented Oct. 7, 1930

1,777,405

UNITED STATES PATENT OFFICE

PAUL A. FRANK, OF AKRON, OHIO

TIRE-BUILDING DRUM

Application filed September 25, 1928. Serial No. 308,185.

This invention relates to tire building drums such as are employed in the manufacture of pneumatic tires by the flat band method.

In the manufacture of tires and especially straight side tires by the flat band method, a transversely flat drum provided with reduced shoulders at its edges forming seats for the inextensible beads as heretofore been employed. These drums necessarily must be collapsible and have been constructed in sections supported upon collapsing chucks of various types. These drum constructions are quite expensive to build and require considerable maintenance and also operation of the collapsing mechanism is accomplished only with a fair degree of rapidity.

The object of the present invention is to provide a collapsible drum which is simple and inexpensive to construct, comparatively low in maintenance and capable of very rapid collapsing and expanding operation.

More particularly, the invention has for its object the provision of a tire building drum, the periphery of which comprises a flexible envelope enclosing an air chamber and adapted to be held expanded in transversely flat form by air under pressure in said chamber and to be collapsed by suction applied to said chamber.

The foregoing and other objects of the invention are attained in the constructions of tire building drums illustrated in the accompanying drawings and described below. It is to be understood, however, that the invention is not limited to the particular forms thereof illustrated and described.

Of the accompanying drawings:

Figure 3 is a radial section through a modified form of drum shown expanded for building of a tire thereon; and Figure 4 is a similar view showing said drum collapsed.

Figure 2:
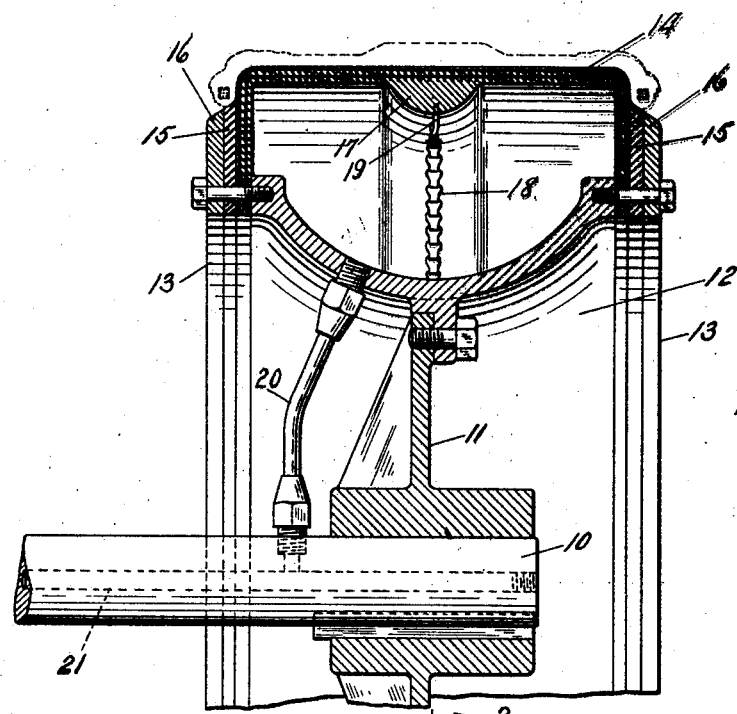
Figure 2 is a radial section thereof on line 2—2 of Figure 1.
Figure 1:
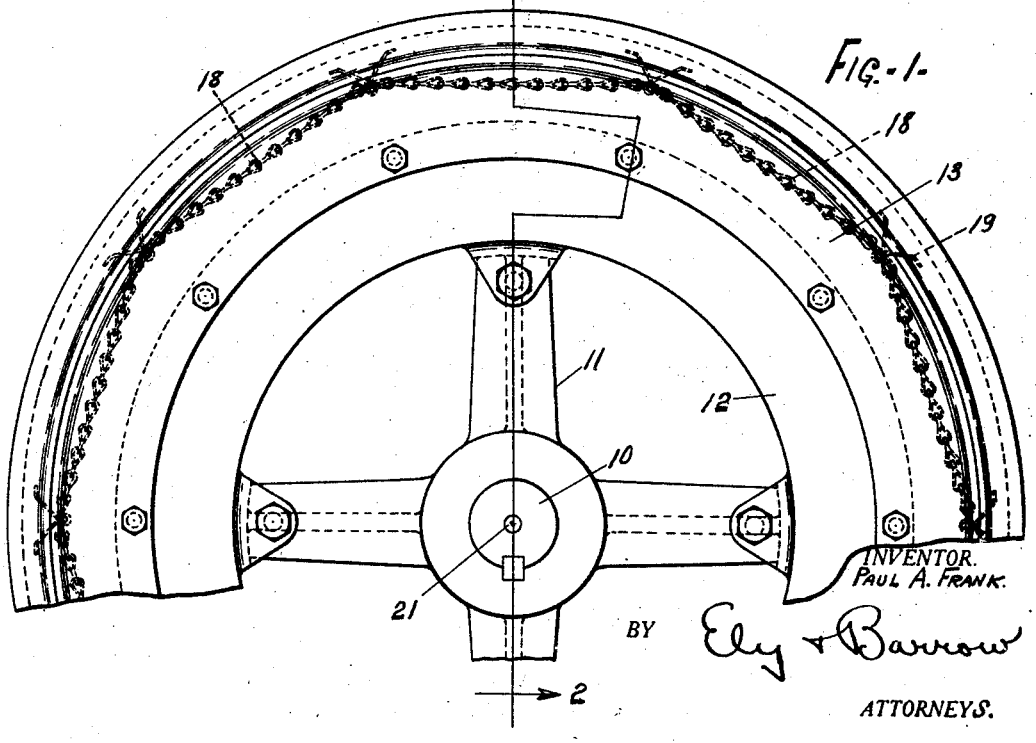
Figure 1 is a side elevation of a portion of a tire building drum embodying the invention.

Referring to Figures 1 and 2 of the drawings, the numeral 10 designates the driven shaft of a tire building machine on which is secured a spider 11 supporting an annular, peripherally channeled drum member 12.

The peripheral channel of the drum member may be defined in part by clamping radial flange rings 13, 13 which secure onto the drum member a flexible envelope 14 which may be constructed of rubber and fabric. Intermediate flexible strips of rubber 15 may be utilized between the envelope 14 and the flange rings 13. The outer edges of the flanges 13 and the strips 15 are formed to provide the usual beveled bead seating shoulders at 16, 16.

In order that the envelope 14 shall assume a transversely flat shape across the periphery of the drum, it may be reinforced centrally, as by a bead of rubber, indicated at 17, and tension members such as chains 18, 18 extended about the inner periphery of the envelope may be secured thereto by loops 19, 19 secured by vulcanization in the bead 17.

The air and suction connections to the chamber defined by the channeled drum member and the envelope may comprise a duct 21 in the drive shaft 10 and one or more radial connections 20 between the duct 21 and the channel of the drum member.

The strips 15 at opposite sides of the envelope 14 extend outside of the inner circumference of the bead, so that when the finished carcass is to be removed from the drum, the flexible edges of the strips will yield to permit the easy removal of the tire. The body of the envelope is reinforced by circumferential and transverse cords 22 and 23 which maintain the form or envelope 14 in flat condition and prevent its expansion beyond the fixed limitations thereof.

In Figures 3 and 4, the drive shaft $10^a$ has secured thereon a peripherally channeled drum member $12^a$ which has mounted in the channel a flexible envelope $14^a$ provided with bead seats at $16^a$ and expanded and contracted respectively by air under pressure or suction in the manner of a piston, said envelope having portions $16^b$, $16^b$ riding on the inner walls of the channel which act as guides therefor. The air and suction connections are duct $21^a$ in shaft $10^a$ and one or more connections 20ᵃ between the duct 21ᵃ and the channel.

In both forms of the invention the tire is constructed in flat band form on the drum while expanded by air under pressure, the cross section profile of the tire being indicated in dotted lines in the drawings. After completion of the tire, the inflation pressure is relieved and suction is applied, collapsing the flexible envelope and permitting removal of the finished tire band. After removal of the band, the air under pressure is again supplied to the drum to expand the envelope ready for the next tire building operations. In the form of the invention shown in Figures 1 and 2, the central tensioning means shown holds the envelope in the desired transversely flat shape when expanded.

The circumferential and transverse cords in the form of the invention shown in Figures 3 and 4 maintain the envelope in flattened condition. The envelope in either form of the invention can be arched transversely, if desirable.

It will be apparent from the foregoing that a simple, effective and inexpensive collapsible drum for building tires has been provided. Obviously, modifications of this invention other than disclosed herein may be resorted to without departing from the spirit thereof or the scope of the appended claims.

What is claimed is:

1. Apparatus for building flat band tires comprising a drum including a peripherally channeled drum member, a flexible envelope mounted about the peripheral channel thereof and secured thereto at its edges, said envelope defining reduced bead seats at the edges of the drum and having tension means associated with the central portion thereof to hold the envelope transversely flat when expanded, and air pressure and suction connections to said channel.

2. Apparatus for building flat band tires comprising a drum including a peripherally channeled drum member, a flexible envelope mounted about the peripheral channel thereof, said envelope defining reduced bead seats at the edges of the drum, and air pressure and suction connections to said channel.

3. A collapsible tire building drum comprising a central drum member and a flexible member about the same adapted to be expanded by air under pressure introduced between the central drum member and the flexible envelope to assume a transversely flat shape and defining reduced bead seating shoulders at the edges of the drum.

4. A collapsible tire building drum comprising a central drum member and a flexible member about the same adapted to be expanded by air under pressure introduced between the central drum member and the flexible envelope to assume a transversely flat shape.

5. A collapsible tire building drum comprising a central drum member and a flexible member about the same adapted to be expanded by air under pressure introduced between the central drum member and the flexible envelope to assume a transversely flat shape and defining reduced bead seating shoulders at the edges of the drum and adapted to be contracted by suction applied between the central drum member and the flexible envelope to permit removal of a tire therefrom.

6. A collapsible tire building drum comprising a central drum member and a flexible member about the same adapted to be expanded by air under pressure introduced between the central drum member and the flexible envelope to assume a transversely flat shape and adapted to be contracted by suction applied between the central drum member and the flexible envelope to facilitate removal of a tire therefrom.

7. A collapsible drum for building tires comprising a central drum member, a flexible envelope about the drum member and radial flange rings for clamping the envelope at its edges onto the drum member and defining a channel confining the envelope axially and tension means centrally and inwardly of the envelope for confining the envelope radially, and means for introducing air under pressure into said channel.

8. A collapsible drum for building tires comprising a central drum member having radial flanges at either end defining a channel, a flexible envelope about the channel, and means for expanding the envelope outwardly of the channel or contracting the envelope into the channel.

9. A collapsible drum for building tires comprising a central drum member, a flexible envelope completely covering the periphery of the drum member, and pneumatic means for expanding or contracting the flexible envelope relative to the periphery of the central drum member.

10. An expansible and collapsible tire building drum including a central drum member and a flexible member about the same adapted to be pneumatically expanded and contracted and to present a transversely flat peripheral portion with reduced bead seating shoulders at the edges of the drum when expanded.

11. An expansible and collapsible tire building drum including a central drum member and a flexible member about the same adapted to be pneumatically expanded and contracted and to present a transversely flat peripheral portion when expanded.

12. A drum for building tires by the flat band method, said drum having a central area upon which the tire is to be built and reduced bead seats at the edges thereof, that portion of the drum upon which the tire is built being capable of contraction by surrounding atmospheric pressure, and means for creating a vacuum on the inner side of said area.

13. A drum for building tires by the flat band method, said drum having an endless flexible ring about its outer circumference forming a central area upon which the tire is to be built and reduced bead seats at the edges thereof, that portion of the drum upon which the tire is built being capable of contraction by surrounding atmospheric pressure, and means for creating a vacuum on the inner side of said area.

14. A drum for building tires by the flat band method, said drum having an endless flexible ring about its outer circumference forming a central area upon which the tire is to be built and reduced bead seats at the edges thereof, that portion of the drum upon which the tire is built being capable of contraction by surrounding atmospheric pressure, and means for creating alternative conditions of vacuum and pressure on the inner side of said area.

PAUL A. FRANK.